Sept. 4, 1945. R. S. BIGELOW 2,384,069
SHAKER CONVEYER TROUGH
Filed March 31, 1944
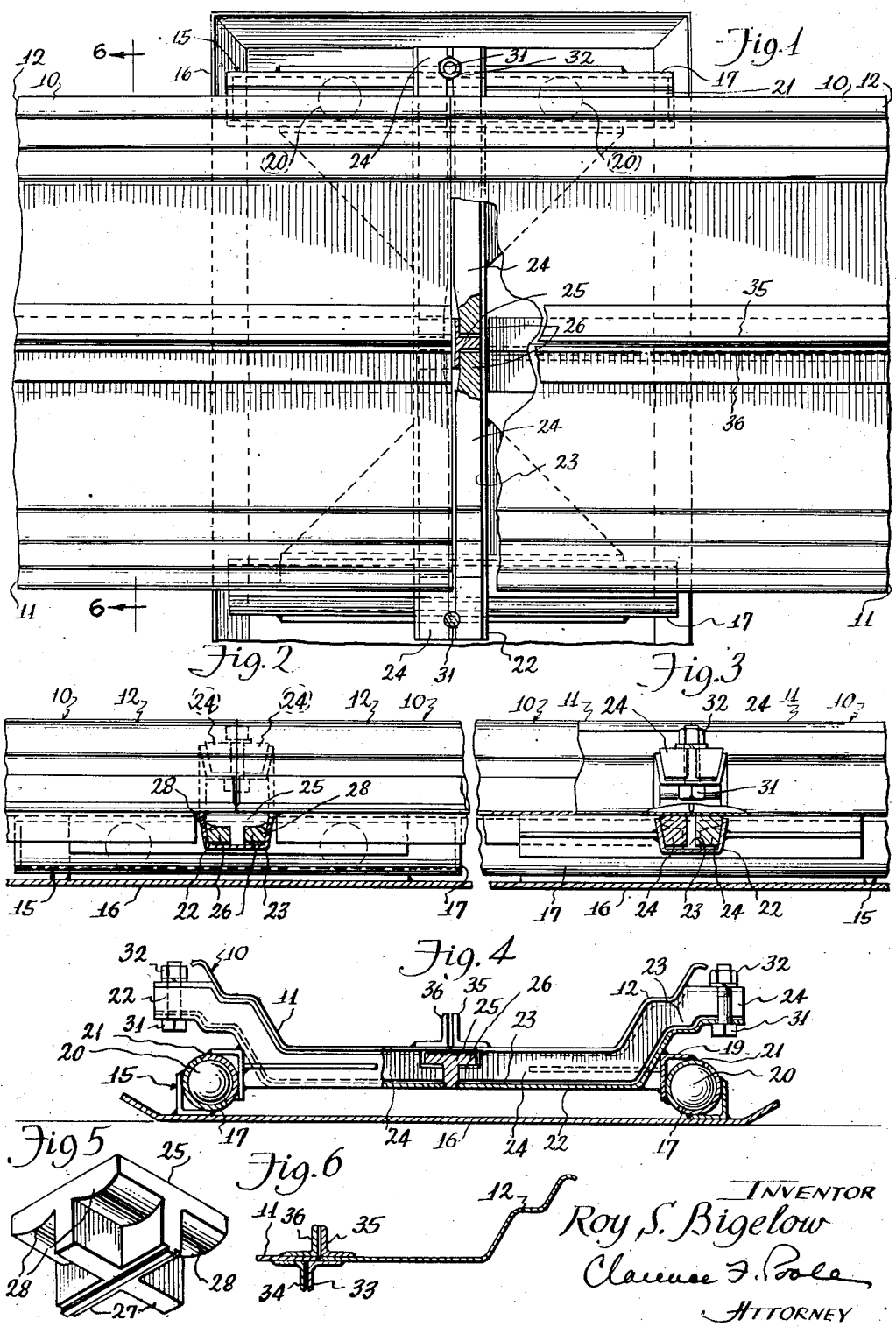
INVENTOR
Roy S. Bigelow
Clarence F. Poole
ATTORNEY Patented Sept. 4, 1945

2,384,069

UNITED STATES PATENT OFFICE 2,384,069

SHAKER CONVEYER TROUGH

Roy S. Bigelow, Chicago, Ill., assignor to Goodman Manufacturing Company, Chicago, Ill., a corporation of Illinois Application March 31, 1944, Serial No. 528,837

14 Claims. (Cl. 198—220)

This invention relates to improvements in shaker conveyer troughs and connecting means therefor.

Heretofore, face loading machines of the "caterpillar" mounted type having gathering arms which gather the loose material onto chain conveyers have discharged their loads onto shaker conveyer trough lines, arranged to transfer the material to a main line belt conveyer extending along a mine entry. The largest shaker conveyer troughs in use at the present time, however, do not have the capacity to efficiently handle the full capacity of a face loading machine, so as to permit continuous operation of the loading machine, and with the present equipment it is not possible to provide a shaker conveyer of sufficient capacity to handle the full capacity of the loading machine, because a trough of such capacity would weigh in the neighborhood of 600 pounds, and thus would be too heavy to be handled by the crew in the working place, especially in thin seams of coal.

My invention has as its principal objects to remedy this difficulty by providing a novel form of large capacity sectional shaker conveyer trough, which is split longitudinally, so each section can readily be handled by the crew underground, together with a novel means for connecting these troughs together and holding them in vertical and longitudinal alignment with respect to each other.

A more specific object of my invention is to provide a split connecting trough wherein the ball frames for reciprocably supporting opposite ends of the troughs serve to connect the troughs together and to hold them in alignment with each other.

Other objects of my invention will appear from time to time as the following specification proceeds and with reference to the accompanying drawing wherein:

Figure 1 is a top plan view of adjacent ends of a pair of troughs of a shaker conveyer trough line, with certain parts broken away and certain other parts shown in horizontal section;

Figure 2 is a fragmentary longitudinal sectional view taken substantially through the center of the trough, in order to illustrate certain details of the supporting and connecting means for the troughs;

Figure 3 is a fragmentary view in side elevation, with certain parts broken away and shown in substantially longitudinal section, in order to illustrate certain details of the invention not shown in Figure 2;

Figure 4 is a fragmentary transverse sectional view, taken through the split trough and showing certain details of the connecting means therefor;

Figure 5 is a perspective view of the hold-down member for the trough connecting means; and Figure 6 is a transverse sectional view taken substantially along line 6—6 of Figure 1.

In the drawing, adjacent ends of two split troughs 10, 10 of a shaker conveyer are shown as being connected together in abutting relation with respect to each other. Each split trough is made of two partial troughs, which may be half troughs, abutting at the longitudinal center of the trough and including a trough portion 11 abutting a similar trough portion 12 along its inner edge. Adjacent ends of these trough portions are supported on a ball frame generally indicated by reference character 15, which also forms a connecting means therefor.

The ball frame 15 is of a well known form, which serves as a guide frame, to guide the troughs against lateral displacement, as well as support the troughs for reciprocable movement, and is herein shown as including a bottom plate 16 adapted to rest on the ground and having two semi-cylindrical guide members 17, 17 extending longitudinally of the trough line along opposite sides of said bottom plate and suitably mounted thereon. Said bottom plate and guide members form a lower frame member for said ball frame, which has an upper frame member 19 of said ball frame reciprocably mounted thereon, on balls 20, 20 mounted in the guide members 17, 17 and having rolling support with similar guide members 21, 21, which face the guide members 17, 17. Said guide members form a part of the upper frame member 19 of said ball frame, which includes a transversely extending connecting member 22 mounted on the guide members 21, 21, adjacent its opposite ends. The bottom of said connecting member conforms substantially to the contour of the trough 10, and has opposite forward and rear inclined side walls extending upwardly from the bottom thereof, which form a wedge-shaped recess or socket 23, extending across the trough line.

Each trough portion 11 and 12 has a connecting tongue 24 extending transversely of and depending from each end thereof. Each of said tongues is formed to substantially conform to the transverse section of the underside of its associated trough portion, and extends upwardly along the sides of said trough portions and laterally therefrom to conform to the form of the socket 23, and is adapted to extend within said socket. Said socket thus forms a connecting and supporting means for adjacent ends of the trough portions 11, 11 and 12, 12.

A hold-down member 25 is mounted at its lower end in the center of a socket 23 of the connecting member 22, and is adapted to be engaged by shouldered inner ends 26, 26 of the tongues 24, 24, for holding the ends of said tongues down and spacing said tongues with respect to each other. Said hold-down member, as herein shown, has a substantially square top which is mounted on integrally formed crossed legs 27, 27 secured to the bottom of said socket 23 of the connecting member 22, as by welding. The undersides of the top of said hold-down member, on opposite sides of the transversely extending leg 27 thereof, are of an arcuate rocker-like formation, as indicated by reference characters 28, 28. Said rocker-like under surfaces of said connecting member are adapted to be engaged by arcuate upper surfaces of the shouldered inner ends 26, 26 of the tongues 24, 24, to hold the ends of said tongues down, but to permit a limited amount of rocking or rolling movement of said tongues with respect to each other to permit reciprocable movement of the troughs where the ball frames at opposite ends of the troughs are mounted on an uneven mine bottom.

In connecting the trough portions 11, 11 and 12, 12 together, each trough portion is first tilted so the inner ends 26, 26 of the tongues 24, 24 may be inserted in the sockets formed between the underside of the top of the retaining member 25 and the bottom of the socket 23. The outside of each trough portion is then lowered, so said inner ends of said tongues will extend beneath the top of the hold-down member 25 and completely within said sockets. The outer ends of adjacent troughs are then bolted in position by means of bolts 31, 31, which extend through the bottom of the guide member 21, adjacent its opposite ends, and which are abutted by inner recessed portions of adjacent tongues 24, 24 formed to receive said bolts. Nuts 32 threaded on said bolts are provided to hold said tongues within said sockets.

The inner abutting longitudinal edges of the trough portions 11, 12 are maintained in parallel relation with respect to each other by means of an angle 33, which is secured to the bottom of the trough portion 12 and extends beyond its inner edge and has the bottom of the inner edge of the trough portion 11 resting thereon. Another angle 34 is secured to the bottom of the trough portion 11 and extends therealong parallel to the angle 33 and is disposed closely adjacent said angle, when the inner edges of said trough portions are in abutting relation with respect to each other. An angle 35 is secured to the upper side of the trough portion 12 and extends longitudinally therealong, adjacent the inner edge thereof, and its vertical leg is adapted to abut the vertical leg of a parallel angle 36, which is secured to the upper side of the trough portion 11, adjacent the inner edge thereof. Said angles are so arranged that there is normally a slight clearance between the vertical legs thereof, to permit limited flexibility of the troughs along their inner edges and to facilitate assembly of the trough line. When, however, the split trough tends to move upwardly along its longitudinal center, the vertical legs of the angles 33, 34 will abut each other to limit this upward movement. Likewise, when the portions of the trough tend to move downwardly with respect to each other along the longitudinal center of said split trough, the vertical legs of the angles 35, 36 will abut each other and limit this downward movement.

It may be seen from the foregoing that a novel form of high capacity shaker conveyer trough line has been provided, which may handle the entire capacity of a face loading machine, and which includes a plurality of connected troughs split longitudinally so the sections thereof may readily be handled at the working place of a mine underground, the sections of which split troughs are connected together in side by side and end to end relation with respect to each other in a positive and simplified manner by the depending tongues 24, 24 extending within the sockets 23, 23 which form a part of the ball frame, reciprocably supporting adjacent ends of the sections of said troughs. It may further be seen that a simplified means has been provided to prevent the separation of the trough portions of the split troughs adjacent their longitudinal center, which also serves to aid in maintaining a tight joint between said trough portions.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A sectional shaker conveyer trough having two partial trough portions abutting at their bottoms along a line extending longitudinally of said trough, to form a single trough having opposite side walls, means for connecting said trough portions together along said abutting edges, and means for maintaining a tight joint between said trough portions and for restraining upward or downward movement of the longitudinal abutting edges of said trough portions with respect to each other about their outer edges including members depending from the bottoms of said trough portions and adapted to form a longitudinal abutting joint spaced from the abutting edges of said trough portions.

2. A sectional shaker conveyer trough having two partial trough portions abutting at their bottoms along a line extending longitudinally of said trough, to form a single trough having opposite side walls, means for connecting said trough portions together along said abutting edges, and means for maintaining a tight joint between said trough portions and for restraining upward or downward movement of the longitudinal abutting edges of said trough portions with respect to each other about their outer edges including members depending from the bottoms of said trough portions and adapted to form a longitudinal abutting joint spaced from the abutting edges of said trough portions, and other members extending upwardly from said trough portions and longitudinally therealong and adapted to have abutting engagement with each other upon the tendency of said troughs to move upwardly or downwardly with respect to each other along said abutting edges.

3. A sectional shaker conveyer trough having two partial trough portions abutting at their bottoms along a line extending longitudinally of said trough, to form a single trough having opposite side walls, means for connecting said trough portions together along said abutting edges, and means for maintaining a tight joint between said trough portions and for restraining upward or downward movement of the longitudinal abutting edges of said trough portions with respect to each other about their outer edges including members depending from the bottoms of said trough portions and adapted to form a longitudinal abutting joint spaced from the abutting edges of said trough portions, and other members extending upwardly from and longitudinally along the abutting edges of said trough portions and adapted to have abutting engagement with each other, upon the tendency of said troughs to move upwardly or downwardly with respect to each other along said abutting edges.

4. A sectional shaker conveyer trough including two trough portions abutting along a line extending longitudinally of said trough, means for reciprocably supporting said trough portions at their ends and connecting said trough portions together along said abutting edges, and means for maintaining a tight joint between said trough portions and for restraining upward or downward movement of the longitudinal abutting edges of said trough portions with respect to each other about their outer edges including a member extending along the underside of one trough portion and having a depending portion spaced from and parallel to the abutting edge of said trough portion and another member extending along the bottom of the next adjacent trough portion and having a depending portion spaced from the abutting edge of said trough portion and adapted to abut said other depending portion upon the tendency of one of said troughs to be vertically displaced with respect to the other.

5. A sectional shaker conveyer trough including two trough portions abutting along a line extending longitudinally of said trough, means for reciprocably supporting said trough portions at their ends and connecting said trough portions together along said abutting edges, and means for maintaining a tight joint between said trough portions and for restraining upward or downward movement of the longitudinal abutting edges of said trough portions with respect to each other about their outer edges including a member extending along the underside of one trough portion and having a depending portion spaced from and parallel to the abutting edge of said trough portion and adapted to abut a depending portion of a similar member extending along the bottom of the next adjacent trough portion, an abutting member extending along the top of one trough portion along the abutting edge thereof, and another abutting member extending along the top of the next adjacent trough portion in juxtaposition to said first mentioned abutting member when said trough portions are in connected relation with respect to each other.

6. A shaker conveyer trough including two trough portions abutting along a line extending longitudinally of said trough, means for reciprocably supporting said trough portions at their ends and for connecting said trough portions together along said abutting edges, and means for maintaining a tight joint between said trough portions and for restraining upward or downward movement of the longitudinal abutting edges of said trough portions with respect to each other about their outer edges including an angle mounted on the bottom of one trough portion and having a leg extending parallel to the abutting edge of said trough portion and depending from said bottom at a point spaced from the abutting edge thereof, and another angle mounted on the bottom of said other trough portion and having a leg extending parallel to the abutting edge of said trough portion at a point spaced from said abutting edge and adapted to have abutting engagement with said first mentioned angle upon the tendency of one trough to be vertically displaced with respect to the other about its outer edge.

7. A shaker conveyer trough including two trough portions abutting along a line extending longitudinally of said trough, means for reciprocably supporting said trough portions at their ends and for connecting said trough portions together along said abutting edges, and means for maintaining a tight joint between said trough portions and for restraining upward or downward movement of the longitudinal abutting edges of said trough portions with respect to each other about their outer edges including an angle mounted on the bottom of one trough portion and having a leg extending parallel to the abutting edge of said trough portion and depending from said bottom at a point spaced from the abutting edge thereof, and another angle mounted on the bottom of said other trough portion and having a leg extending parallel to the abutting edge of said trough portion at a point spaced from said abutting edge and adapted to have abutting engagement with said first mentioned angle, and other angles extending upwardly from the bottoms of said trough portions and adapted to have abutting engagement with each other along the abutting edges of said trough portions.

8. A shaker conveyer trough having two partial trough portions abutting at their bottoms along a line extending longitudinally of said trough, to form a single trough having opposite outwardly flared side walls, means for reciprocably supporting said trough portions at their ends and for connecting said trough portions together along said abutting edges including a reciprocably movable support member having a socket extending transversely of said trough, each of said trough portions having a depending tongue adapted to extend within said socket, and a hold-down member intermediate the ends of said sockets adapted to be engaged with the inner ends of said tongues.

9. A shaker conveyer trough having two partial trough portions abutting at their bottoms along a line extending longitudinally of said trough, to form a single trough having opposite outwardly flared side walls, means for reciprocably supporting said trough portions at their ends and for connecting said trough portions together along said abutting edges, including a reciprocably movable support member having a socket extending transversely of said trough, each of said trough portions having a depending tongue adapted to extend within said socket, a hold-down member intermediate the ends of said sockets adapted to be engaged with the inner ends of said tongues, and other means having engagement with the outer ends of said tongues for holding said tongues in engagement with said sockets.

10. In a shaker conveyer trough line, a plurality of shaker conveyer troughs including two trough portions abutting at their bottoms along a line extending longitudinally of said trough, to form a single trough having opposite longitudinally extending side walls, means reciprocably supporting said trough portions in side by side and end to end relation and for connecting said troughs together along said abutting edges including sockets extending transversely of said troughs adjacent opposite ends thereof, a tongue depending from each end of each of said trough portions and adapted to extend within said sockets, and hold-down means intermediate the ends of said socket adapted to be engaged by and to hold down the inner ends of said tongues.

11. In a shaker conveyer trough line, a plurality of shaker conveyer troughs including two trough portions abutting at their bottoms along a line extending longitudinally of said trough, to form a single trough having opposite longitudinally extending side walls, means reciprocably supporting said trough portions in side by side and end to end relation and for connecting said troughs together along said abutting edges including sockets extending transversely of said troughs adjacent opposite ends thereof, a tongue depending from each end of each of said trough portions and adapted to extend within an associated socket, and hold-down means intermediate the ends of said socket adapted to be engaged by and to hold down the inner ends of said tongues, and other means having engagement with the outer ends of said tongues for holding said tongues in engagement with said sockets.

12. In a shaker conveyer trough line, a plurality of shaker conveyer troughs including two trough portions abutting at their bottoms along a line extending longitudinally of said trough, to form a single trough having opposite longitudinally extending side walls, means reciprocably supporting said trough portions in side by side and end to end relation and for connecting said troughs together along said abutting edges including sockets extending transversely of said troughs adjacent opposite ends thereof, a tongue depending from each end of each of said trough portions and adapted to extend within an associated socket, hold-down means intermediate the ends of said socket adapted to be engaged by and to hold down the inner ends of said tongues, and means cooperating with said tongues and sockets for maintaining a tight joint between said trough portions and for restraining upward or downward movement of the longitudinal abutting edges of said trough portions with respect to each other about their outer edges including members depending from the bottoms of said trough portions and extending longitudinally therealong, said members being spaced from the abutting edges of said trough portions and adapted to have abutting engagement with each other.

13. In a shaker conveyer trough line, a plurality of shaker conveyer troughs including two trough portions abutting at their bottoms along a line extending longitudinally of said trough, to form a single trough having opposite longitudinally extending side walls, means reciprocably supporting said trough portions in side by side and end to end relation and for connecting said troughs together along said abutting edges including sockets extending transversely of said troughs adjacent opposite ends thereof, a tongue depending from each end of each of said trough portions and adapted to extend within an associated socket, hold-down means intermediate the ends of said socket adapted to be engaged by and to hold down the inner ends of said tongues, and means cooperating with said tongues and sockets for maintaining a tight joint between said trough portions and for restraining upward or downward movement of the longitudinal abutting edges of said trough portions with respect to each other about their outer edges including members depending from the bottoms of said trough portions and extending longitudinally therealong, said members being spaced from the abutting edges of said trough portions and adapted to have abutting engagement with each other, and other members extending upwardly from said trough portions and longitudinally along the abutting edges thereof, and adapted to have abutting engagement with each other upon upward or downward movement of the inner edges of said trough portions about their outer edges.

14. In a shaker conveyer trough line, a plurality of shaker conveyer troughs including two trough portions abutting at their bottoms along a line extending longitudinally of said trough, to form a single trough having opposite longitudinally extending side walls, means reciprocably supporting said trough portions in side by side and end to end relation and for connecting said troughs together to form a continuous trough line including a reciprocably movable supporting frame at each end of each of said troughs, each of said supporting frames including a connecting member extending transversely of said troughs, a transverse socket formed in said connecting member and substantially conforming to the cross section of said troughs, a tongue extending along the bottom of each trough portion and upwardly along the side thereof, said tongues of adjacent ends of said trough portions being adapted to extend within an associated socket formed in said connecting member, and a hold-down member intermediate the ends of said socket adapted to be engaged by and hold down the inner ends of said tongues within said socket.

ROY S. BIGELOW.